(12) United States Patent
Lenart et al.

(10) Patent No.: US 7,624,196 B2
(45) Date of Patent: Nov. 24, 2009

(54) SYSTEMS AND APPARATUS FOR MANAGING A STORAGE DEVICE ADDRESS

(75) Inventors: Alexandre Lenart, Fort Collins, CO (US); Steven Maddocks, Windsor, CO (US); Gregory Turpin, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 10/982,086

(22) Filed: Nov. 5, 2004

(65) Prior Publication Data

US 2005/0226066 A1 Oct. 13, 2005

Related U.S. Application Data

(60) Provisional application No. 60/561,038, filed on Apr. 8, 2004.

(51) Int. Cl.
*G06F 15/16* (2006.01)
(52) U.S. Cl. ............. 709/245; 709/213; 709/223; 709/224; 711/1; 370/474; 370/475
(58) Field of Classification Search ........... 709/224, 709/223, 213, 238–245; 717/172; 711/1; 370/474, 475
See application file for complete search history.

(56) References Cited

U.S. PATENT DOCUMENTS

| 6,842,841 | B1 * | 1/2005 | Kuik et al. | 711/203 |
| 7,171,167 | B2 * | 1/2007 | Lie et al. | 455/74.1 |
| 2003/0187973 | A1 * | 10/2003 | Wesley | 709/224 |
| 2004/0031030 | A1 * | 2/2004 | Kidder et al. | 717/172 |
| 2004/0136246 | A1 * | 7/2004 | Kosuge | 365/200 |

OTHER PUBLICATIONS

Alexandre Lenart, et al., "Systems and Apparatus for Managing a Storage Device Address", U.S. Appl. No. 60/561,038, filed Apr. 8, 2004.

* cited by examiner

*Primary Examiner*—Thu Ha T Nguyen

(57) ABSTRACT

A storage device is communicatively coupled to a management station and comprises an interface manager to send a notification to the management station when a network address of the storage device is changed to a new address. The management station retains information on the network address of the storage device and, upon receipt of a notification, reestablishes a connection to the storage device using the new address. Related methods, and components of the system, are also disclosed.

20 Claims, 3 Drawing Sheets

US 7,624,196 B2

SYSTEMS AND APPARATUS FOR MANAGING A STORAGE DEVICE ADDRESS

CROSS-REFERENCE TO RELATED APPLICATION

This application claims priority, under 35 U.S.C. 119(e), to application No. 60/561,038 filed on Apr. 8, 2004, which is hereby incorporated by reference.

BACKGROUND

Storage devices, such as tape libraries, may have interfaces that allow the storage device to be accessed over a network. In certain circumstances, the storage device's address (e.g., an Internet Protocol (IP) address) may change. By way of example, the address of the storage device may change if the storage device is reconfigured to use a static IP address in lieu of a dynamic IP address (e.g., an address obtained from a dynamic host configuration protocol (DHCP) server), or vice versa. The address of the storage device may also change if the storage device uses a dynamic IP address, and the storage device is re-started.

If the address of a storage device changes, clients that attempt to communicate with the storage device using its old address may not be able to find the storage device, and clients that are communicating with the storage device may lose their connection to the storage device. This communication failure may result in unexpected terminations of client applications. Additionally, if the address of a storage device is a dynamic IP address (or is changed to be a dynamic IP address), it is not easy for clients of the storage device to determine what address the storage device is using. As a result, clients may not be able to access the storage device until a user can, for example, 1) physically read an address from the storage device (e.g., via a display panel of the storage device), or 2) physically access the storage device by means of a serial connection to which the user connects a laptop computer or some other device.

SUMMARY

One aspect of the invention is embodied in a system comprising a management station and a storage device. The storage device is communicatively coupled to the management station and comprises an interface manager to send a notification to the management station when a network address of the storage device is changed to a new address. The management station retains information on the network address of the storage device and, upon receipt of a notification, reestablishes a connection to the storage device using the new address.

Another aspect of the invention is embodied in apparatus comprising a remote management interface, an event server, and an event client. The remote management interface serves changes in an Internet Protocol (IP) address of a storage device to at least one client. The event server is communicatively coupled to the remote management interface to receive a notification of a new IP address for the storage device. The event client is communicatively coupled to the remote management interface to re-establish a connection with the storage device using the new IP address.

Yet another aspect of the invention is embodied in at least one machine-readable medium. Stored on the media are sequences of instructions that, when executed by a machine, cause the machine to perform the actions of: 1) receiving a notification of a new address from a storage device, 2) storing the new address, 3) re-establishing a connection to the storage device using the new address, and 4) providing the new address to a remote client of the storage device.

Other embodiments of the invention are also disclosed.

BRIEF DESCRIPTION OF THE DRAWINGS

Illustrative embodiments of the invention are illustrated in the drawings in which.

DETAILED DESCRIPTION

Figure 1:
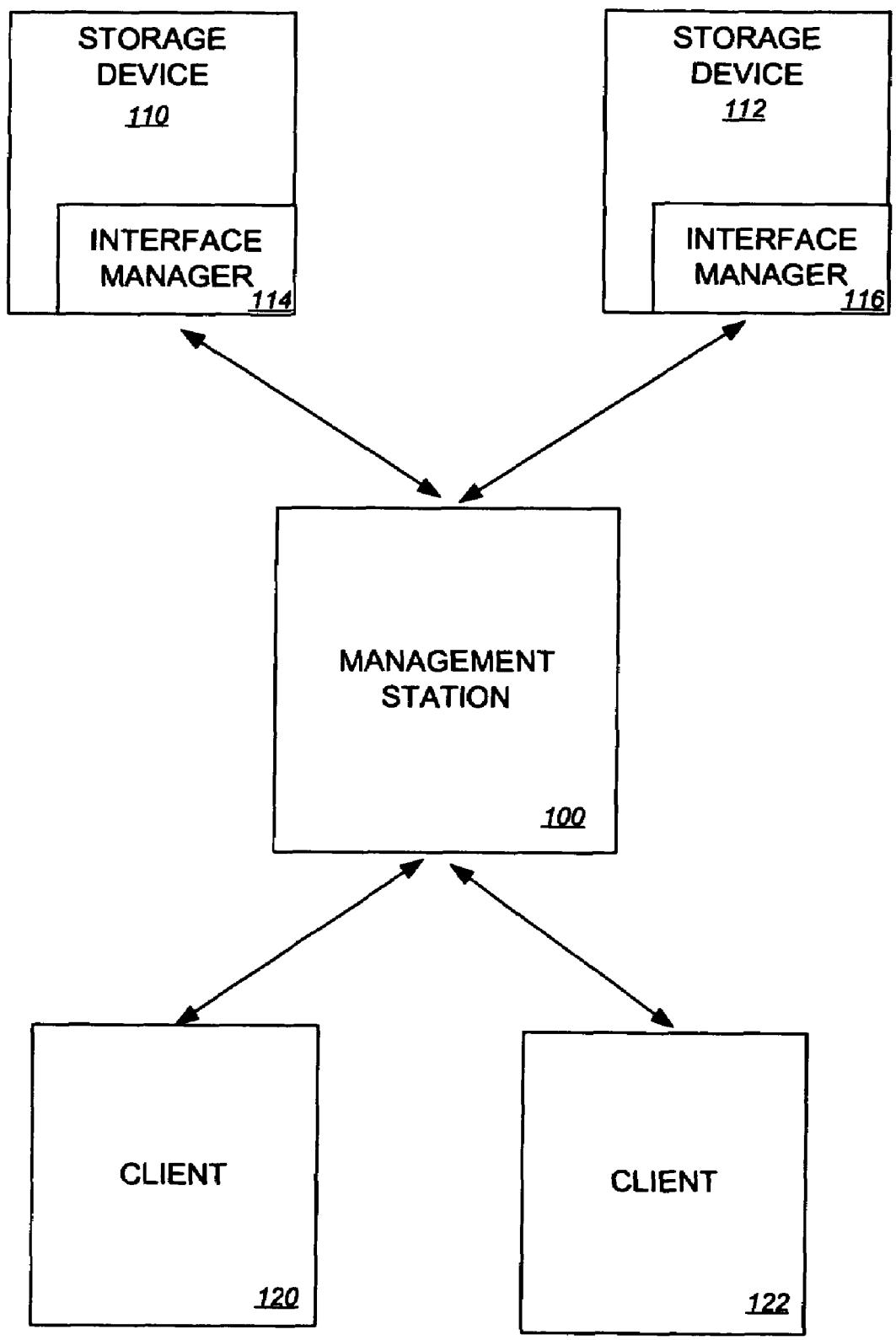
FIG. 1 illustrates an exemplary configuration of a system that may be used for managing a storage device address.

An exemplary system that may be used to manage a storage device address is shown in FIG. 1. The system comprises one or more storage devices 110, 112. By way of example, each of the storage devices 110, 112 may be a tape device (e.g., a robotic tape library) or a disk device (e.g., a disk array or optical tape library).

Each storage device 110, 112 may be provided with an interface manager 114, 116 that allows the storage device to be accessed over a network. In one embodiment, the interface managers 114, 116 are implemented on network cards of the storage devices 110, 112. One or both of the interface managers 114, 116 may be configured to use a static address (e.g., a static Internet Protocol (IP) address) or a dynamic address (e.g., a dynamic IP address). In one embodiment, the storage devices 110, 112 obtain dynamic addresses from a Dynamic Host Configuration Protocol (DHCP) server (not shown). In some instances, the dynamic address of one of the storage devices may change when the storage device 110, 112 is restarted. The address of a storage device may also change if the storage device is reconfigured to use a static address in lieu of a dynamic address, or vice versa.

The storage devices 110, 112 are communicatively coupled to a management station 100. By way of example, the storage devices 110, 112 may be coupled to the management station 100 via an IP network. In one embodiment, the management station 100 is embodied in software executing on a server. In order to communicate with the storage devices 110, 112, the management station 100 must know the current addresses of the storage devices 110, 112. Thus, the management station 100 retains information on the current address of each storage device 110, 112. Information retained by the management station 100 may also comprise other configuration information for the storage devices 110, 112. As will be described in further detail below, the interface manager 114, 116 of a storage device 110, 112 may automatically notify the management station 100 of a change in its storage device's address. This notification may help prevent unexpected loss of communication with the storage devices 110, 112.

In one embodiment, management station 100 is used to send management requests (e.g., device control requests) received from one or more clients 120, 122 to storage devices 110, 112. However, in some embodiments, the clients 120, 122 may also have a "back door" communication connection to the storage devices 110, 112. Thus, upon receipt of a notification that the address of one of the storage devices 110, 112 has changed, the management station 100 may update the clients 120, 122 with a new address for the storage device.

Figure 2:
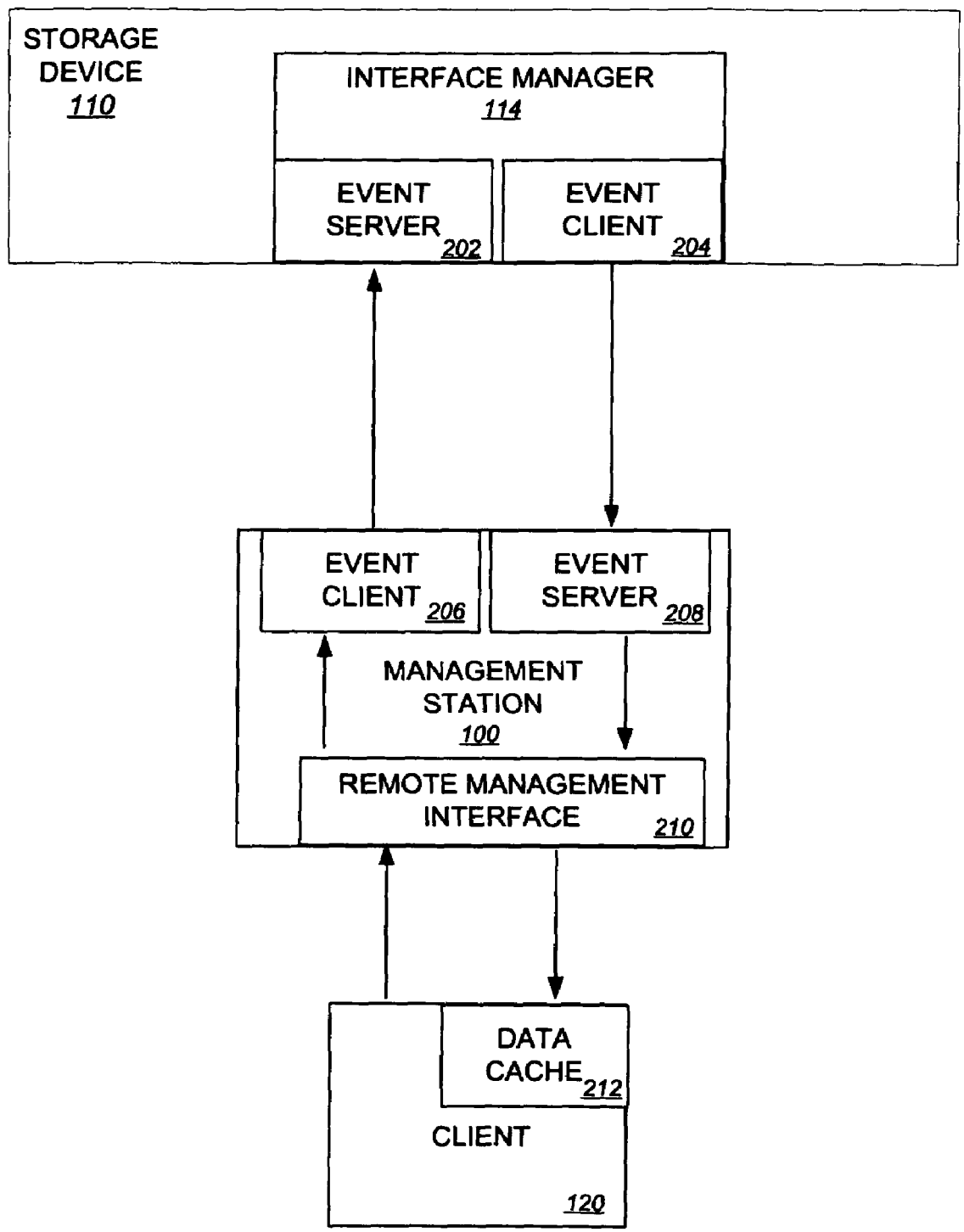
FIG. 2 illustrates exemplary configurations of some of the components of the FIG. 1 system.

FIG. 2 illustrates an exemplary embodiment of the management station 100, one storage device 110, and one client

120 of the FIG. 1 system. As shown, the management station 100 may comprise a remote management interface 210 that is communicatively coupled to an event client 206. The remote management interface 210 may be used to receive one or more management requests (e.g., device control requests) that client 120 issues to storage device 110. By way of example, the remote management interface 210 may comprise a web server that serves one or more pages of a Java-based graphical user interface (GUI) to the web clients 120, 122. The remote management interface 210 may also comprise a remote procedure call (RPC) mechanism (e.g., Java remote method invocation (RMI)) to receive the management requests from the web clients. Remote management interface 210 may then dispatch these requests to event client 206.

In one embodiment, the remote management interface 210 of management station 100 (or other components of management station 100) may process the management requests received from client 120 before they are sent to the event client 206. Thus, a single request from a client 120 may result in multiple requests being sent to event client 206. Alternately, management station 100 may not process the management requests received from client 120.

Upon receiving a management request, the event client 206 dispatches the management request to the storage device 110. The interface manager 114 of the storage device 110 may comprise an event server 202 to receive and process the requests from the event client 206. By way of example, the event client 206 may be a Simple Object Access Protocol (SOAP) client, and the event server 202 may be a SOAP server.

Interface manager 114 may further comprise an event client 204 (e.g., a SOAP client). The event client 204 may be used to asynchronously notify management station 100 of a change in the address of storage device 110. Alternately, the event client 204 may transmit the current address of storage device 110 at regular intervals. Management station 100 may comprise an event server 208 (e.g., a SOAP server) to receive the notification. The event server 208 communicates the new address of the storage device 110 to the remote management interface 210 (to which the event server 208 is communicatively coupled). The remote management interface 210 may then send the new address of the storage device 110 to the event client 206 and direct the event client 206 to re-establish a connection to the event server 202 using the new address.

In one embodiment, the client 120 may include a data cache 212 to store information received from the remote management interface 210. The client 120 may include a web browser, and the data cache 212 may be a cache that is associated with the web browser. The data cache 212 may be used to store the current address of the storage device 110. Upon receipt of a notification that the address of the storage device 110 has changed, the remote management interface 210 may update the data cache of client 120 with the new address.

In the configuration described above, different components were described as being communicatively coupled to other components. A communicative coupling is defined herein to be any coupling that allows communication between two or more components. By way of example, a communicative coupling may comprise a bus, cable, network, wireless mechanism, or program code call (e.g., a modular or procedural call). Thus, event client 206, event server 208, and remote management interface 210 may reside on the same or different physical devices.

Figure 3:
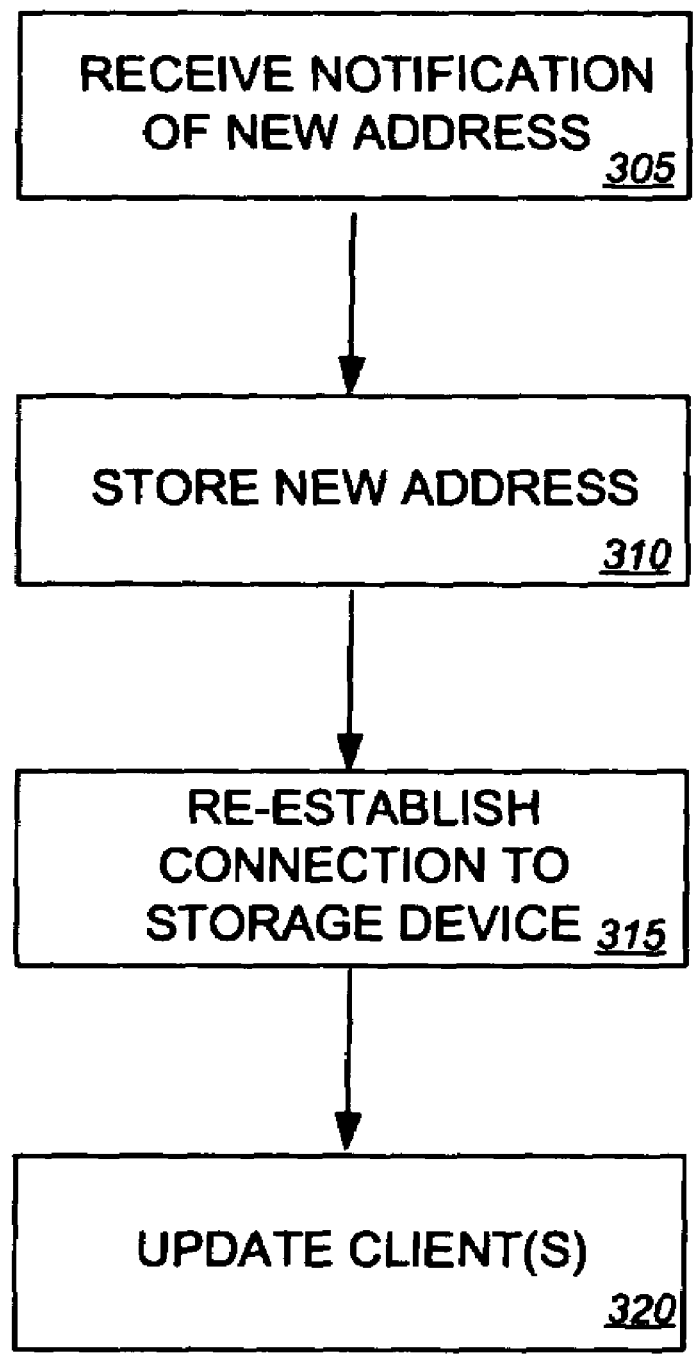
FIG. 3 provides a flow diagram illustrating an exemplary method for managing a storage device address.

FIG. 3 illustrates an exemplary method that may be used to manage a storage device address. As was previously described, the address of a storage device may change because of a network configuration change (e.g., a change from static to DHCP addressing) or because the storage device is restarted. The FIG. 3 method begins with a device's receipt 305 of a notification from a storage device. The notification includes information on a new address for the storage device.

Upon receipt of the notification, the new address is stored 310 and then used 315 to re-establish a connection to the storage device. In one embodiment, the device receiving the notification then provides 320 the new storage device address to a remote client.

In the foregoing description, and for purposes of illustration, the method of FIG. 3 was described in a particular order. In alternate embodiments, the method could be performed in a different order. Additionally, the method described above could be performed by hardware components or could be embodied in sequences of machine-executable instructions which cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions.

What is claimed is:

1. A system, comprising:
   a management station;
   a storage device that is communicatively coupled to the management station, said storage device comprising an interface manager to send a notification to the management station when a network address of the storage device is changed to a new network address;
   a client that accesses storage of the storage device by sending device control requests over an Internet Protocol (IP) network through the management station to the storage device; and
   said management station executing on a server that is separate from the client and the storage device and retaining information on the new network address of said storage device, sending the new network address to the client and, upon receipt of said notification, the client reestablishing a connection to the storage device using the new network address.

2. The system of claim 1, wherein the storage device is a robotic tape library or an optical tape library that includes an interface to allow the storage device to be accessed by the client over the IP network.

3. The system of claim 1, wherein the management station sends the new address over the IP network to the client.

4. The system of claim 1, wherein the storage device obtains the new network address from a Dynamic Host Configuration Protocol (DHCP) server.

5. The system of claim 1 wherein the network address of the storage device changed due to a restart of the storage device.

6. The system of claim 1, wherein the management station comprises a web server, and wherein the client is a web client of the web server.

7. The system of claim 1, wherein said management station comprises a remote method invocation (RMI) server to process said management requests.

8. The system of claim 1, wherein the network address of the storage device comprises an IP address.

9. The system of claim 1, wherein the network address of the storage device changes when the storage device is reconfigured to use a static address in lieu of a dynamic address.

10. The system of claim 1, wherein the storage device comprises a network card, and wherein said interface manager is implemented on said network card.

11. The system of claim 1, wherein the interface manager comprises a simple object access protocol (SOAP) client and a SOAP server, wherein the interface manager sends the notification to the management station via the SOAP client, and wherein the management station reestablishes a connection to the SOAP server.

12. A system, comprising:
plural client computers;
a web server that serves pages of graphical user interface (GUI) over a network to the plural client computers;
a storage device including an event server that receives and processes management requests from the plural client computers and including an event client that notifies the web server of a change in an Internet Protocol (IP) address of the storage device; and
wherein the web server receives a new IP address from the storage device and transmits the new IP address over the network to the plural client computers, and the plural client computers transmit the management requests through the web server to the storage device by re-establishing a connection with storage device using the new IP address.

13. The system of claim 12, wherein the client computers include a data cache that stores a current IP address of the storage device.

14. The system of claim 12, wherein the storage device is a disk array.

15. The system of claim 12, wherein the event client comprises a simple object access protocol (SOAP) client, and wherein the event server comprises a SOAP server.

16. At least one machine-readable medium, having stored thereon sequences of instructions that, when executed by a machine, cause the machine to perform the actions of:
receiving over a network at a server a notification of a new Internet Protocol (IP) address from a storage device after an IP address of the storage device changes;
storing the new IP address in the server that is separate from the storage device;
re-establishing a connection between the server and the storage device using the new IP address; and
providing the new IP address from the server to a remote client to notify the remote client that the IP address of the storage device changed.

17. The machine-readable media of claim 16, wherein the instructions provide the new IP address to the remote client by updating a data cache of the remote client.

18. The machine-readable media of claim 16, wherein the instructions implement a simple object access protocol (SOAP) server to receive the notification of the new IP address.

19. The machine-readable media of claim 18, wherein the instructions implement a SOAP client to re-establish the connection to the storage device.

20. The machine-readable media of claim 16, wherein the IP address of the storage device changes to the new IP address due to a restart of the storage device.

* * * * *